United States Patent [19]

Zeisel

[11] Patent Number: 4,662,841

[45] Date of Patent: May 5, 1987

[54] METHOD FOR BURNING AND SINTERING LIMESTONE, DOLOMITE AND THE LIKE AND PLANT FOR THE IMPLEMENTATION THEREOF

[76] Inventor: Peter Zeisel, Overhoffstr. 3, D-4630 Bochum, Fed. Rep. of Germany

[21] Appl. No.: 800,122

[22] PCT Filed: Mar. 14, 1985

[86] PCT No.: PCT/DE85/00082

§ 371 Date: Oct. 30, 1985

§ 102(e) Date: Oct. 30, 1985

[87] PCT Pub. No.: WO85/04163

PCT Pub. Date: Sep. 26, 1985

[30] Foreign Application Priority Data

Mar. 16, 1984 [DE] Fed. Rep. of Germany ....... 3409727

[51] Int. Cl.4 .................... F27D 1/08; F27B 15/00
[52] U.S. Cl. ........................... 432/14; 432/96; 432/99
[58] Field of Search ............ 432/95, 96, 99, 101, 432/223, 14

[56] References Cited

U.S. PATENT DOCUMENTS

| 3,033,545 | 5/1962 | Azbe | 432/99 |
|---|---|---|---|
| 3,142,480 | 7/1964 | Azbe | 432/99 |
| 3,392,969 | 7/1968 | Muller | 432/99 |
| 3,544,090 | 12/1970 | Peeters | 432/96 |
| 3,761,567 | 9/1973 | Parsons | 432/99 |
| 3,955,915 | 5/1976 | Buchner | 432/96 |
| 4,015,932 | 4/1977 | Zurawski | 432/223 |
| 4,403,951 | 9/1983 | Beckenbach et al. | 432/96 |
| 4,473,352 | 9/1984 | Sonoda et al. | 432/99 |

FOREIGN PATENT DOCUMENTS 2050051 4/1972 Fed. Rep. of Germany .
7920765 4/1980 France .

Primary Examiner—Henry C. Yuen
Attorney, Agent, or Firm—Karl F. Ross; Herbert Dubno

[57] ABSTRACT

A method and apparatus is disclosed for burning and sintering alkaline materials such as limestone and dolomite in a shaft furnace wherein the alkaline material travels successively through a preheating, burning and cooling area. At the upper end of the cooling area the cooling air traversing the shaft from bottom to top is aspirated into a recuperator wherein fresh combustion air is preheated by the cooling air and then supplied to the burner which heats the burning area. Part of the aspirated cooling air may also be directed past the recuperator through a bypass conduit to heat a dryer which dries the materials to be processed by the shaft furnace.

6 Claims, 1 Drawing Figure

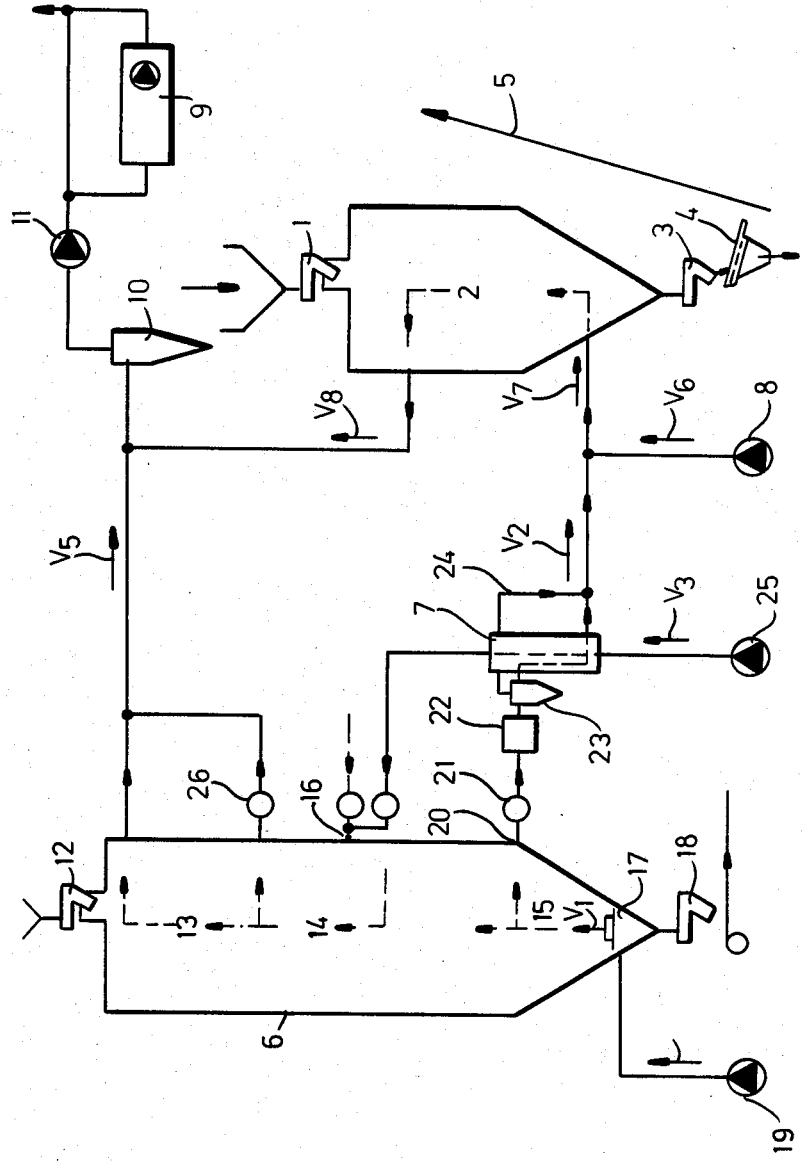

METHOD FOR BURNING AND SINTERING LIMESTONE, DOLOMITE AND THE LIKE AND PLANT FOR THE IMPLEMENTATION THEREOF

CROSS REFERENCE TO RELATED APPLICATIONS

This application is a national phase application corresponding to PCT/DE85/00082 filed Mar. 14, 1985 and based upon German application P 34 727.9 filed Mar. 16, 1984 under the International Convention.

FIELD OF THE INVENTION

The invention refers to a process for burning and sintering of lump materials, such as limestone, dolomite, clay pellets of the aluminum industry and the like in a shaft furnace heated by oil, gas or coal dust, wherein the material passes successively through a preheating area, a burning area and a cooling area and wherein at the top end of the cooling area, cooling air traversing this area from bottom to top is aspirated and heated combustion air is supplied to the burner.

BACKGROUND OF THE INVENTION

It is known from German open application 31 40 582 that the cooling air, brought up from the bottom to the cooling area of a shaft furnace for cooling the burned and sintered goods and which gets heated in this cooling process, can be aspirated in the upper part of the cooling area and supplied to the burner as combustion air. In the case of such a shaft furnace the heat consumption is noticeably lower, since the heat content of the cooling air is used for the combustion process.

Unfortunately the quality of the aspirated reheated cooling air is variable in its heat and oxygen content. This has proven to be a disadvantage since it leads to undesired oscillations of the temperature in the combustion area.

The object of this invention is to make possible the use of the heat content of the reheated aspirated cooling air to supply the burner with combustion air having a constant heat and oxygen level.

SUMMARY OF THE INVENTION

In accordance with the invention, this object is attained by passing the combustion air supplied to the burner through a recuperator fed with the reheated cooling air.

When the temperature of the aspirated cooling air is high, part of this cooling air can be directed through a bypass duct which bypasses the recuperator. If, on the contrary, the aspirated cooling air does not reach the temperature required for the heating of the combustion air, the aspirated cooling air is reheated before entering the recuperator.

The heat content of the cooling air remaining in the recuperator after the combustion air has been heated, can be used as heating- or combustion air, but is preferably used in a drier for drying the material to be processed by the shaft furnace.

The installation according to the invention is characterized by the presence of a recuperator supplied with cooling air aspirated from the shaft furnace through a closed-circuit pipe and reheating the combustion air it directs towards the burner. Preferably, a bypass duct directing part of the cooling air past the recuperator is provided; thereby, the presence of a cyclone between the closed-circuit pipe and the recuperator is necessary.

An air preheater can be provided for further heating of the cooling air supplied to the recuperator.

BRIEF DESCRIPTION OF THE DRAWING

The drawings consist of a single FIGURE. This FIGURE provides a schematic overview of the claimed process and apparatus. Gas streams are diagrammatically displayed by means of arrows and equipment represented symbollically.

Further features and advantages of the invention result from the following description, wherein the example of one embodiment is illustrated in detail by the schematical drawing consisting of a sole FIGURE.

SPECIFIC DESCRIPTION

The material to be burnt and sintered prepared in the form of wet pellets is supplied by a bucket conveyor over a sluiceway 1, free from infiltrated air, to the shaft drier 2. The pellets travel through the shaft of the drier and are directed at its lower end via a sluiceway 3 and a sieve 4 towards the bucket conveyor 5 which carries them to the sluiceway 12 of the shaft furnace 6.

The spent cooling air $V_2$ directed through a recuperator 7 of the shaft furnace $V_6$, after the admixing of dry fresh air 6 by a ventilator 8 and the cooling thereof to the temperature level acceptable to enter the drier, is supplied as drying air $V_7$ to the shaft drier 2. The spent drying air $V_8$ together with the output of the shaft furnace $V_5$ is then cleaned by a dust collector 9 preceded by the cyclone 10 and directed towards the flue by an exhaust fan 11.

The dried lump material brought into the shaft furnace 6 by means of the bucket conveyor 5 over the sluice 12 in order to be burned and sintered reaches first the preheating area 13, where it is heated in countercurrent by the exhaust gases of the sintering area 14 to the sintering temperature level. After this, the material travels through the sintering area which consists of several levels arranged on top of each other, each having several burners 16.

In the cooling area 15, the pellets transfer their heat to the cooling air $V_1$ travelling in countercurrent, which is blown into the lower part of this area by means of an enclosed blower 19. At the lower end of the cooling area 15, the burnt material is pushed by a rotary rod 17 over a table in the silo provided underneath. The pellets are then removed from the silo over a sluice 18, free of infiltrated air. The cooling air $V_1$, pressed into the furnace by the enclosed blower 19 in the discharge area, flows through the cooling area 15. Most of $V_1$ leaves at the upper end of this cooling area 15 through several openings 20 in the shell of the shaft furnace and is then collected in a closed-circuit pipe 21. From the closed-circuit pipe 21 the spent cooling air $V_2$ is first directed through an air preheater 22 and then through a recuperator 7. A part of the heat content of the spent cooling air $V_2$ in recuperator 7 is transferred to the combustion air $V_3$ which is pushed through the recuperator 7 by means of an enclosed blower 25. Another part of the spent cooling air $V_2$ can be directed past the recuperator 7 by a bypass 24. The partial amounts of the spent cooling air $V_2$ that are passed through the recuperator are reunited with the partial amounts of the spent cooling air $V_2$ lead through the bypass 24. This serves, in given cases with the addition of fresh drying air $V_6$, as the drying air $V_7$.

The preheating area 13 of the shaft furnace 6 is divided into a lower and an upper preheating area by openings in the furnace shell. The entire amount of the exhaust gas flows through the lower preheating area, while only a partial amount of the exhaust gas passes through the upper preheating area. The remaining exhaust gas is transferred with a high temperature through the openings into a closed-circuit pipe 26 and subsequently mixed with the exhaust gases exiting the furnace port. The total amount of exhaust gases aspirated with the aid of the fan 11 into the dust remover 9.

Thus, in accordance with the invention, it is possible to use the heat content of the spent cooling air $V_2$, by transferring a portion of this heat content in the recuperator to the combustion air $V_3$. When the amount of heat in the cooling air $V_2$ is not sufficient to raise the temperature of the combustion air $V_3$ to the desired level, which can be the case at the beginning of the combustion process, the spent cooling air $V_2$ can be brought to a temperature level in the preheater 22 which will be sufficient to satisfy the requirements of heating the combustion air in the recuperator to the desired temperature level. The air preheater 22 can also be arranged between the recuperator 7 and the burner 16, so that the combustion air $V_3$ is directly brought to the desired temperature level. When the heat content of the spent cooling air $V_2$ surpasses the level required for heating the combustion air $V_3$, a portion of the spent cooling air $V_2$ can be directed past the recuperator 7 through a bypass duct 24 and can afterwards be reunited with the portion of the spent cooling air $V_2$ which passed through the recuperator 7 and in given cases, with an addition of fresh air $V_6$ to be used as drying air, is directed towards the drier 2 as drying air $V_7$.

The process and apparatus according to the invention make possible the supply of air heated to a certain temperature and rich in oxygen to the burners 16, whereby as a rule the energy required for that is provided by the spent cooling air. The burning and sintering process in the shaft furnace takes place under preestablished conditions, which is not the case when the cooling air with variable temperature and oxygen content is directly used as combustion air. The use of the spent cooling air after transferring a part of the heat content to the combustion air in the recuperator for heating purposes, particularly for drying the materials to be processed in the shaft furnace, further improves the energy balance of the process and the plant.

It has proven particularly advantageous in the case of a furnace cross section which—in a manner known per se—is subdivided into several sections, to regulate the burners present in each of these sections separately.

A particularly advantageous way to regulate the system is to measure the quantity of cooling air entering the furnace and the quantity of spent cooling air aspirated therefrom and to keep the difference between these two quantities at a constant value.

Further, it has proven to be advantageous when at least one part of the exhaust gases is aspirated at a temperature lying above the condensation point of the alkali materials and their temperature is then lowered suddenly by means of cold air or of the cooler exhaust gases aspirated at the furnace stack to a temperature lying below the condensation point of the alkali materials.

The features of the invention disclosed in the preceding description, in the drawing, as well as in the claims can be essential for the realization of the invention in its various embodiments, either considered individually or in any desired combination.

I claim:

1. A process for burning and sintering lump material, such as limestone, dolomite and the like, in an oil, gas or coal dust heated shaft furnace comprising steps of:
   (a) feeding said material to said shaft furnace whereby said material travels successively through a preheating area, a burning area and a cooling area;
   (b) introducing cooling air to said shaft furnace at a lower end thereof wherein said cooling air traverses said cooling area from a bottom to a top of said area and is aspirated from said top;
   (c) directing at least a portion of said aspirated cooling air into a recuperator to heat but not combine with a combustion air;
   (d) supplying said combustion air to at least one burner supplying heat to said burning area of said shaft furnace;
   (e) directing a second portion of said aspirated cooling air past said recuperator through a bypass conduit;
   (f) feeding said second portion of aspirated cooling air from said bypass closed-circuit pipe into a drier for drying the materials to be processed by the shaft and measuring of a quantity of cooling air entering the furnace and the quantity of aspirated cooling air leaving the furnace so that the difference between said quantities can be regulated and maintained at a constant value.

2. A process according to claim 1 wherein said second portion of said aspirated cooling air is combined with fresh air and said combined airs are fed to said drier.

3. A process according to claim 1 wherein said aspirated cooling air supplied to the recuperator is first preheated before entering the recuperator.

4. A process according to claim 1 wherein said aspirated cooling air is treated to remove dust prior to entering the recuperator.

5. A process according to claim 1 further comprising aspirating a least one portion of exhaust gases leaving said shaft furnace at a temperature lying above the condensation point of said lump materials and then suddenly lowering the temperature below the condensation point of said lump materials by means of colder exhaust gases aspirated at the furnace stack.

6. A process according to claim 1 further comprising enriching said combination air with oxygen.

* * * * *